United States Patent
Sanding

(10) Patent No.: US 7,359,698 B2
(45) Date of Patent: Apr. 15, 2008

(54) SYSTEMS AND METHODS FOR ENHANCED OVER-THE-AIR PROGRAMMING

(75) Inventor: Anthony N. Sanding, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 10/657,476

(22) Filed: Sep. 8, 2003

(65) Prior Publication Data

US 2005/0054336 A1    Mar. 10, 2005

(51) Int. Cl.
*H04M 3/00* (2006.01)

(52) U.S. Cl. .................. 455/418; 455/419; 455/420; 455/414.1; 455/3.03; 455/3.01; 455/92; 375/260

(58) Field of Classification Search ............... 455/418, 455/419, 420, 414.1; 375/260
See application file for complete search history.

(56) References Cited

U.S. PATENT DOCUMENTS

| | | | |
|---|---|---|---|
| 5,046,082 A | 9/1991 | Zicker et al. | |
| 5,400,389 A | 3/1995 | Niiyama et al. | |
| 5,507,009 A | 4/1996 | Grube et al. | |
| 5,673,317 A | 9/1997 | Cooper | |
| 5,699,275 A | 12/1997 | Beasley et al. | |
| 5,715,462 A | 2/1998 | Iwamoto et al. | |
| 5,734,904 A | 3/1998 | Kanamori et al. | |
| 5,771,386 A | 6/1998 | Baumbauer | |
| 5,784,537 A | 7/1998 | Suzuki et al. | |
| 5,790,856 A | 8/1998 | Lillich | |
| 5,835,778 A | 11/1998 | Yoshihara | |
| 5,930,704 A | 7/1999 | Kay | |
| 5,938,766 A | 8/1999 | Anderson et al. | |
| 5,974,310 A * | 10/1999 | Bilgic ................ | 455/418 |
| 6,023,620 A | 2/2000 | Hansson | |
| 6,138,009 A | 10/2000 | Birgerson | |
| 6,138,153 A | 10/2000 | Collins et al. | |
| 6,144,849 A * | 11/2000 | Nodoushani et al. ...... | 455/419 |
| 6,195,546 B1 * | 2/2001 | Leung et al. ............... | 455/419 |
| 6,247,065 B1 | 6/2001 | Greenspan et al. | |
| 6,272,333 B1 | 8/2001 | Smith | |
| 6,275,694 B1 | 8/2001 | Yoshida et al. | |
| 6,549,770 B1 | 4/2003 | Marran | |

(Continued)

FOREIGN PATENT DOCUMENTS

DE    19502728    8/1996

(Continued)

OTHER PUBLICATIONS

M. Luby et al., "Asynchronous Layered Coding (ALC) Protocol Instatiation" Cambridge Univ., Dec. 2002.*

(Continued)

*Primary Examiner*—Lester G. Kincaid
*Assistant Examiner*—Charles Shedrick

(57) ABSTRACT

Embodiments of this invention supplement the termination process having the mobile subscriber unit to terminate the call upon completion of an OTA programming session. In one embodiment, the termination is initiated by the mobile subscriber unit after every session. In another embodiment, the termination is initiated after the network fails to terminate the call. In another embodiment, the termination is only initiated in circumstances where it is known that the service provider has failed to terminate the call.

25 Claims, 2 Drawing Sheets

U.S. PATENT DOCUMENTS

| | | | |
|---|---|---|---|
| 6,549,771 B2 * | 4/2003 | Chang et al. ............... 455/419 |
| 6,643,506 B1 | 11/2003 | Criss et al. |
| 6,842,613 B2 * | 1/2005 | Mittal ........................ 455/419 |
| 6,912,256 B1 * | 6/2005 | Noblet ....................... 375/260 |
| 2001/0000538 A1 | 4/2001 | Kowaguchi |
| 2001/0029178 A1 * | 10/2001 | Criss et al. ................. 455/419 |
| 2001/0054161 A1 | 12/2001 | Wooddruff |
| 2002/0094808 A1 | 7/2002 | Tiedemann, Jr. et al. |
| 2003/0153309 A1 | 8/2003 | Bjelland et al. |
| 2004/0261073 A1 * | 12/2004 | Herle et al. ................. 717/173 |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 9841044 | 9/1998 |
| WO | WO 9912380 | 3/1999 |
| WO | WO 9922325 | 5/1999 |
| WO | WO 0073912 | 12/2000 |
| WO | WO 0074412 | 12/2000 |

OTHER PUBLICATIONS

International Search Report (ISR): PCT/ISA/210 for International Application No. PCT/IB02/02869, ISR dated Oct. 28, 2003, 4 pages.

* cited by examiner

SYSTEMS AND METHODS FOR ENHANCED OVER-THE-AIR PROGRAMMING

BACKGROUND

1. Field of the Inventions

The field of the invention relates generally to over-the-air programming of mobile subscriber units and more particularly to termination of over-the-air programming calls.

2. Background Information

Wireless carriers often provide services beyond voice communications in order to provide additional services, conveniences, and features to the mobile phone subscriber. Over-the-air (OTA) programming of a mobile subscriber units, including mobile phones, has become a common method of supplementing services with additional functionality and convenience. The term "mobile subscriber unit" is intended to refer to mobile phones, wireless enabled Personal Digital Assistants (PDA), laptops or other handheld devices, or any other devices that can be used for wireless communications.

An example of OTA programming in a CDMA network is over-the-air parameter administration (OTAPA), which is governed by the IS-683A standard. An OTAPA call is often initiated by the service provider and can be invoked when parameters to an existing mobile subscriber unit need to be updated.

Another example of OTA programming in a CDMA network is over-the-air service provisioning (OTASP), which is also governed by the IS-683A standard. OTASP is used to provide a method to activate a new subscriber for wireless service. In a conventional service provisioning, a customer would purchase a mobile subscriber unit and go to an activation center. A service provider would establish a user profile, Number Assignment Module (NAM), International Mobile Subscriber Identity (IMSI), Roaming Lists and optionally, service and manufacturer specific parameters. In addition, an authentication key and generation procedure can be established. The same service can be provisioned using OTASP, however, in order to reduce costs to the service provider and to make the process more convenient for the customer.

In a typical OTASP provisioning scenario, a customer contacts a service provider either through the use of a different mobile subscriber unit or using an IS-683A OTASP dialing scheme. The customer can supply sufficient information to verify credit worthiness. The mobile subscriber unit then initiates an over-the-air programming call and a service can be provisioned over-the-air.

Though OTAPA and OTASP are given as two significant methods of OTA programming, there are other possibilities for OTA programming, such as synchronization of tones, programming of new ring tones, etc. Furthermore, OTA programming is not restricted to CDMA networks. It should be kept in mind, however, that OTA programming can be network initiated, e.g., OTAPA, or user initiated, e.g., OTASP.

FIG. 1 is a flow chart illustrating an exemplary OTA programming process. First in, step 100 the OTA programming session is initiation. Again, initiation can be controlled by the service provider as is the case for an OTAPA call. After initiation in step 100, a mutual authentication of both the service provider and the mobile subscriber unit can occur as shown in step 102. In step 104, the programming of a parameter, profile, or other data can then take place. If multiple parameters, profiles, or data are to be programmed, then the process can return to step 104. Once programming is complete, the OTA programming session is concluded in step 108. In step 110, the service provider then terminates the call by releasing the allocated communication channel.

Under certain conditions, however, it has been observed that the OTA call may not properly terminate. This can occur, for example, either because the mobile subscriber unit is not informed that the OTA call has concluded, or because the service provider does not properly initiate the release of the communication channel. During this period, the service provider perceives the mobile subscriber unit to be in use, which can prevent the subscriber from receiving calls. For example, because parameter administration or other OTA functions, can occur without the subscriber being aware, i.e., when the OTA session is network initiated, there can be no indication on the mobile subscriber unit informing the subscriber that an OTA session is occurring. Alternatively, the indication can be transient and the subscriber may not see it. As a result, if the OTA-session does not terminate properly and the communication channel is still in use, then the subscriber may unknowingly miss incoming calls. Additionally, the subscriber will be unable to initiate a call until the mobile subscriber unit releases the communication channel used for the OTA call. Battery power is also being drained needlessly while the subscriber unit remains on the communication channel. Since battery power is a precious resource in mobile communication devices, this can be a significant drawback.

SUMMARY OF THE INVENTION

Embodiments of this invention supplement the termination process by having the mobile subscriber unit terminate an OTA call upon completion of an OTA programming session. In one embodiment, the termination is initiated by the mobile subscriber unit after every session. In another embodiment, the termination is initiated after the network fails to terminate the call. In another embodiment, the termination is only initiated in circumstances where it is known that the service provider has failed to terminate the call.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Current standards for many OTA programming applications dictate that the call termination process that releases the allocated channel assigned to a mobile subscriber unit during the OTA programming session be initiated on the network side. However, as described in the background section, under certain conditions the call termination process is not initiated, or not perceived by the mobile subscriber unit to be initiated by the service provider upon completion of the OTA session.

Figure 2:
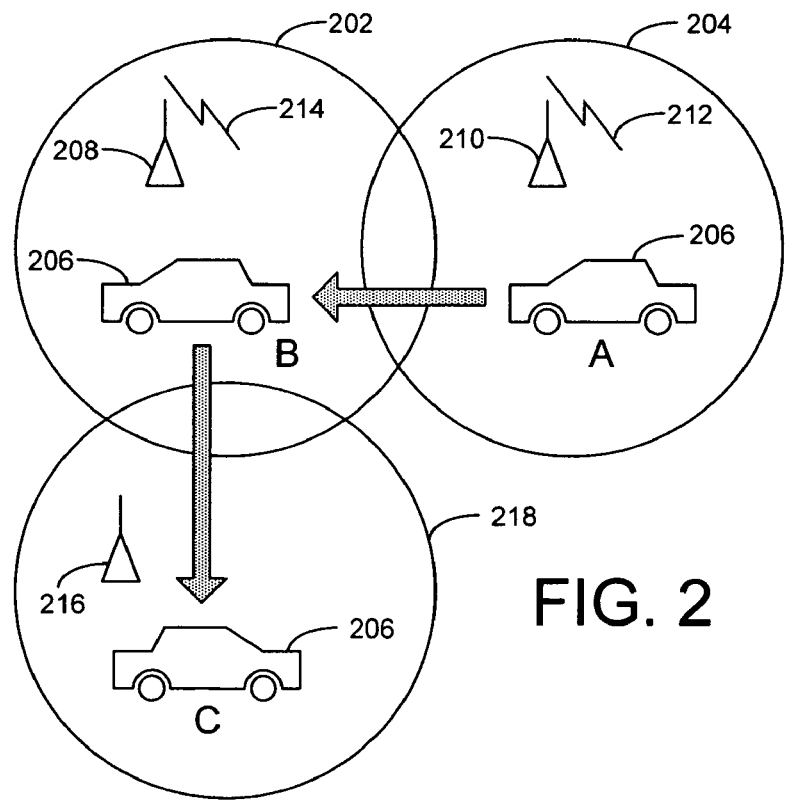
FIG. 2 is a diagram illustrating an example situation in which a mobile subscriber unit can experience a problem releasing an OTA call.

One scenario in which the failure to terminate has been observed is illustrated in FIG. 2. In the example of FIG. 2, a subscriber moves from a digital wireless network 204 to an analog network 202, while engaged in an OTA call. For example, a subscriber can travel along a freeway in their vehicle 206 with their mobile subscriber unit (not shown). While in digital network 204, the mobile subscriber unit can be engaged in an OTA call through base station 210 over digital communication channel 212. As vehicle 206 transitions from point A to point B, however, it can pass from digital network 204 to analog network 202. When this occurs, the OTA call can be transitioned from digital network 204 to analog network 202. The transition process is normally referred to as a hand-off. After a hand-off, the mobile subscriber unit can be engaged in the same OTA call through base station 208 over analog communication channel 214.

Figure 1:
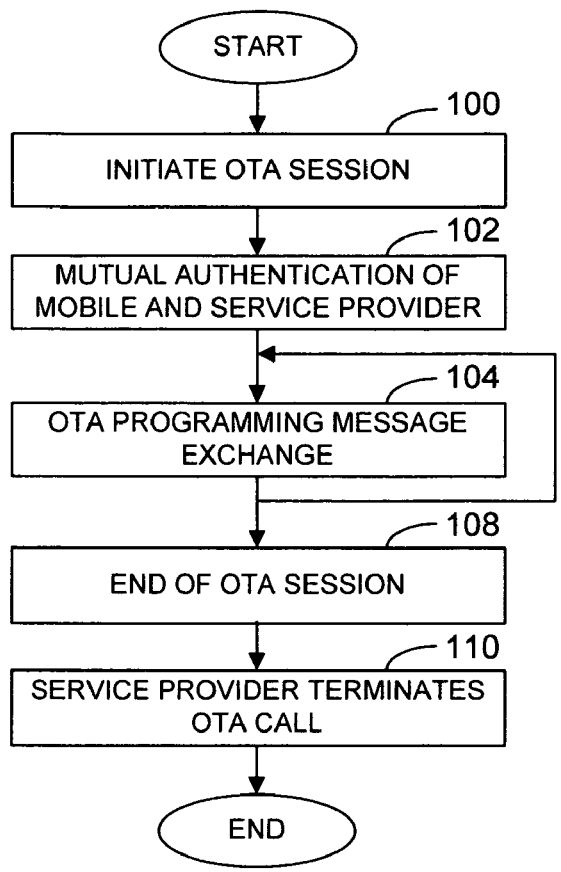
FIG. 1 is a flowchart illustrating an exemplary OTA programming session of the prior art.

The OTA call can, for example, follow the process flow depicted in FIG. 1. Therefore, when the OTA session ends (step 108), analog network 202 should end the OTA call (step 110) and release the mobile subscriber unit. As explained above, however, it is not uncommon for the mobile subscriber unit to stay connected, i.e., fail to be released. Again, as explained above, failure to release the mobile subscriber unit can cause the mobile subscriber unit to use excessive power and prevent it from sending or receiving calls, because the mobile subscriber unit is still on analog communication channel 214.

For example, when the mobile subscriber unit is engaged in a call, the network with which it is interfaced can be configured to notify the subscriber of another incoming call using a "flash with info. message." This assumes that the subscriber has call waiting and that the network allows calls to connect while in an OTA call, e.g., an OTAPA call. If either of these are not the case, then the other call is just missed. A "flash with info. message" can comprise an audible tone played in the ear piece of the mobile subscriber unit and an "incoming call indication" displayed on the display of the mobile subscriber unit. Thus, the subscriber is likely to notice that another call is being received. But if the subscriber is unaware that the mobile subscriber unit is in an OTA call, then the subscriber likely will not hear the audible tone, because the subscriber will not be listening to the ear piece, or notice the display. As a result, the subscriber can easily miss the other incoming call.

In addition, when the mobile subscriber unit is engaged, e.g., in an OTAPA call, analog communication channel 214 can still be engaged when the subscriber unit then transitions back into a digital network 218 if call termination failed as described above. Transitioning back to digital network 218 can only occur, however, when analog communication channel 214 is dropped, allowing the mobile subscriber unit to find digital service in digital network 218. But if the mobile subscriber unit is still engaged in the OTA call due to failed call termination, then it cannot drop analog communication channel 214 to find the digital service. Thus, the mobile subscriber unit cannot transition back to digital network 218.

It should be noted that an OTA call, such as an OTAPA call, can be paged, i.e., use control channels to communicate with the mobile subscriber unit, or "piggy-backed" on a regular call. In either case, a failed call termination can occur. But the situation can be worse for a paged call, because the subscriber will often be unaware that the OTA call is taking place.

Figure 3:
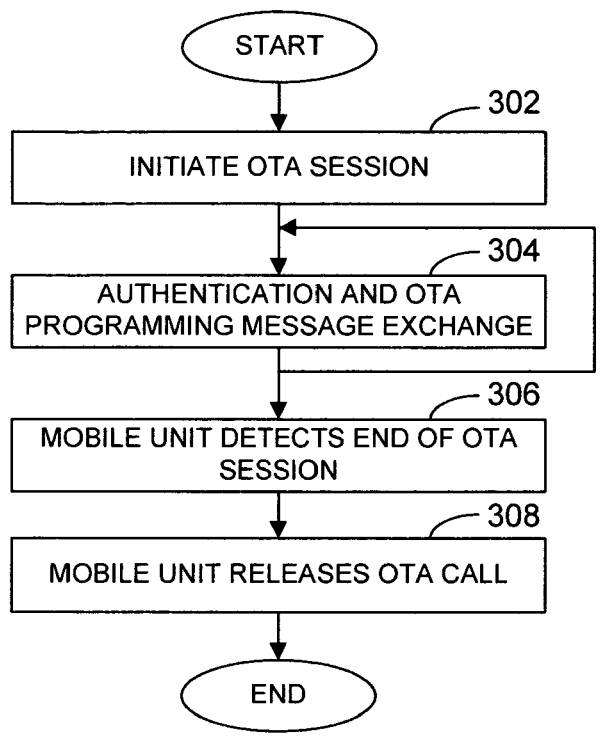
FIG. 3 is a flow chart illustrating an OTA programming session in accordance with one embodiment of the invention.

FIG. 3 is a flow chart illustrating an example method of an OTA programming session in accordance with the systems and methods described herein. In the example process of FIG. 3, an OTA call is initiated, in step 302, for a specific mobile subscriber unit. In step 304, OTA messages are exchanged. Once all OTA messages are exchanged, and the OTA session has ended, the mobile subscriber unit can be configured to detect the end of the OTA session in step 306. The mobile subscriber unit can be configured to then release the OTA call in step 308, once the end of the OTA session is detected in step 306.

The detection of the end of the OTA programming session (step 306) can be implemented through a variety of mechanism. For example, a time-out period can be stored in the mobile subscriber unit. If an OTA message is not received within the time-out period, then the mobile subscriber unit can be configured to release the OTA call. Alternatively, an OTA programming protocol message that specifies the programming session has concluded can be implemented. In such an embodiment, the mobile subscriber unit can be configured to release the OTA call, upon receipt of message.

In another embodiment, the mobile subscriber unit can release the call only if a situation is detected that is known to cause a call release failure after an OTA session. For instance, as explained in relation to FIG. 2, call release failure can occur when a mobile subscriber unit transitions from a digital network 204 to an analog network 202 during an OTA session. Thus, the mobile subscriber unit can be configured to detect when such a transition occurs during an OTA session. The mobile subscriber unit can then be configured to terminate the OTA session when such a transition is detected. In such embodiment, the methods for detecting the end of the OTA session described above can, for example, still be used to detect the end of the OTA session.

Figure 4:
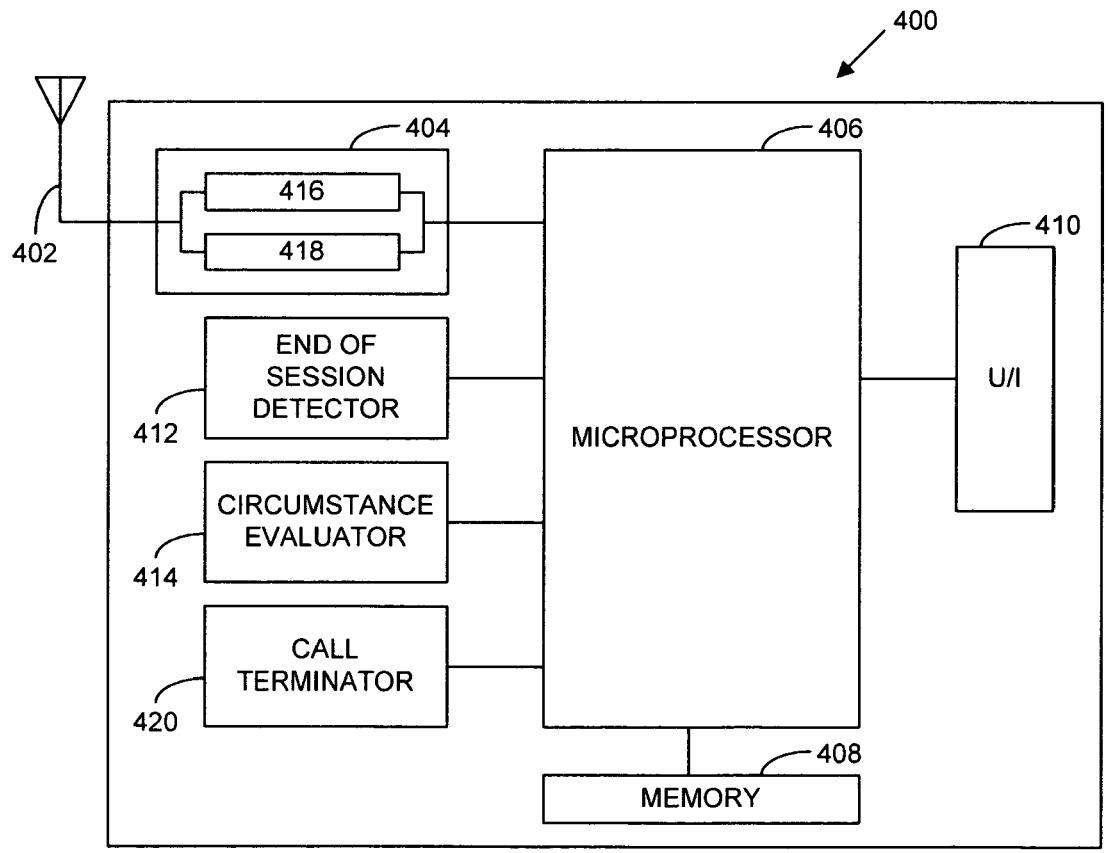
FIG. 4 is a diagram illustrating an exemplary mobile subscriber unit configured with improved OTA programming handling.

FIG. 4 is a diagram illustrating an exemplary mobile subscriber unit configured with improved OTA programming handling in accordance with the systems and methods described herein. Mobile subscriber unit 400 can comprise an antenna 402, a transceiver 404, a microprocessor 406, memory 408, and a user interface 410. Antenna 402 can be coupled to the transceiver 404, which can be coupled to the microprocessor 410. The microprocessor can be coupled to memory 408 and to a user interface 410. User interface 410 can include, for example, a display configured to display information to a subscriber.

Transceiver 404 can comprise receiver 416, which is configured to receive wireless communication signals from antenna 402. Receiver 416 is also preferably configured to filter and amplify the received signals. The received signals are also demodulated by receiver 416. Receiver 416 demodulates the received signal in order to generate a baseband information signal. Typically, a demodulator comprises two stages: the first stage steps the frequency of a received signal down from a Radio Frequency (RF) to an Intermediate Frequency (IF). The IF frequency signal is then stepped down, in the second stage, to baseband. The baseband information signal is then sent to microprocessor 406. Transceiver 404 also includes transmitter 418, which is configured to modulate wireless communication signals generated by microprocessor 406 and send them to antenna 402 to be transmitted.

Microprocessor 406 preferably includes various circuits for controlling the operation of mobile subscriber unit 400 in general, and in particular for controlling communication using transceiver 404. Thus, microprocessor 406 can include various analog-to-digital (A/D) and digital-to-analog (D/A) converters, processors, Digital Signal Processors (DSPs), Vocoders, and peripheral control circuits as required by a particular mobile subscriber unit 400. Alternatively, some or all of these circuits can be included in mobile subscriber unit 400 as stand alone components or as components incorporated into the various components of transceiver 404 or processor 406.

Mobile subscriber unit 400 also preferably includes memory 408. Memory 408 can be used to store the software instructions used by transceiver 404. Thus, memory 408 can comprise a single memory device or a plurality of devices as required by the particular implementation of mobile subscriber unit 400.

Additionally, mobile subscriber unit 400 can comprise an end session detector 412 configured to detect the end of an OTA session. End session detector 412 can be implemented as a separate hardware unit as depicted in the diagram in FIG. 4 or it can be resident as software in memory 408. In other embodiments, end session detector 412 can comprise a combination of hardware and software. End session detector 412 detects the end of an OTA session using one of methods described above. Thus, for example, end session detector 412 can be configured to detect the end session message received via antenna 402 and processed by microprocessor 406. Alternatively, end session detector 412 can comprise a timer (not shown) configured to count for a time out period. If an OTA message is not received by the time the timer times out, then end session detector 412 can be configured to detect the end of the OTA session.

Mobile subscriber unit 400 can also comprise a call terminator 420. Call terminator 420 can be configured to end the OTA call when end session detector 412 detects the end of the OTA session. Call terminator 420 can be implemented in hardware, software, or a combination thereof. In general, call terminator 420 comprises the same hardware and/or software normally included in a mobile subscriber unit for ending a call.

In another embodiment, mobile subscriber unit 400 can comprise a circumstance evaluator 414. Circumstance evaluator 414 can be implemented as a separate hardware unit as shown in FIG. 4 or it can be implemented as software resident in memory 408. In other embodiments, circumstance evaluator 414 can comprise a combination of hardware and software. Circumstance evaluator 414 determines when conditions in which an OTA call may not be properly released using one of the methods described above.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A method for terminating an over-the-air (OTA) programming call comprising the steps of:
   a network initiating the OTA programming call to a mobile subscriber unit, the OTA programming call comprising an OTA programming session;
   the mobile subscriber unit receiving the over-the-air programming call;
   the mobile subscriber unit for detecting an expected termination of the OTA programming call by the network upon the end of the OTA programming session; and
   the mobile subscriber unit terminating the OTA programming call if the expected termination of the OTA programming call by the network is not detected, wherein the expected termination of the OTA programming call is detected without a prior request from the mobile subscriber unit for an expected end of session indicator.

2. The method of claim 1, wherein the over-the-air programming session is an over-the-air service provisioning session.

3. The method of claim 1, wherein the over-the-air programming session is an over-the-air service parameter administration session.

4. The method of claim 1, wherein a failure to receive an expected termination of the OTA programming call is a result of a communication error.

5. The method of claim 1, wherein the step of detecting a failure of the network to terminate the OTA programming further comprises detecting that a time-out period has lapsed without receiving an over-the-air message that the over-the-air session has ended.

6. The method of claim 1, further comprising the step of:
   the mobile subscriber unit detecting a condition associated with a failed over-the-air call release.

7. The method of claim 6, wherein the step of detecting a condition associated with the failed over-the-air call release comprises detecting a transition from a digital network to an analog network while engaged in the associated over-the-air programming call.

8. A mobile subscriber unit, comprising:
   a processor connected to a wireless communication interface, the processor receiving an over-the-air programming session in an over-the-air call initiated by a network and received via the wireless communication interface:
   an end of session detector connected to the processor configured to detect an expected end of session indicator sent by the network, wherein the expected end of session indicator is detected without a prior request from the mobile subscriber unit for the expected end of session indicator; and
   a call terminator coupled to the end session detector, the call terminator configured to terminate the over-the-air call when the end of session detector fails to detect the expected end of session indicator.

9. The mobile subscriber unit of claim 8, wherein the expected end session indicator is an end of session message.

10. The mobile subscriber unit of claim 8, wherein the end session detector comprises a timer configured to timeout after a time-out period if the expected end of session indicator is not detected.

11. The mobile subscriber unit of claim 8, further comprising a circumstance evaluator configured to detect a condition associated with a failure of the end of session detector to detect the expected end of session indicator.

12. The mobile subscriber unit of claim 11, wherein the circumstance evaluator is configured to detect a transition from a digital network to an analog network while the mobile subscriber unit is engaged in the over-the-air call.

13. A wireless communications system comprising:
   a plurality of base stations;
   a system server configured to send an over-the-air programming call to a plurality of mobile subscriber units via the plurality of base stations, the system server configured to terminate the over-the-air programming call, the over-the-air programming call comprising an over-the-air programming session and an expected end of session indicator; and each mobile subscriber unit of the plurality of mobile subscriber units comprising:
- a transceiver circuit configured to receive the over-the-air programming call;
- an end of session detector connected to the transceiver circuit and configured to detect the expected end of session indicator received from the system server, wherein the expected end of session indicator is received from the server without a prior request from the mobile subscriber unit for the expected end of session indicator, and
- a call terminator connected to the transceiver circuit and the end session detector, the call terminator configured to terminate the over-the-air programming call when the end session detector fails to detect the expected end of the session indicator.

14. The system of claim 13, wherein the plurality of base stations includes a digital base station.

15. The system of claim 13, wherein the plurality of base stations includes an analog base station.

16. The system of claim 13, wherein the expected end session indicator is an end of session message sent by the system server.

17. The system of claim 13, wherein the end session detector of the each mobile subscriber unit comprises a timer configured to timeout after a time-out period if the expected end of session indicator is not received from the system server.

18. The system of claim 13, wherein the each mobile subscriber unit further comprises a circumstance evaluator connected to the transceiver circuit and configured to detect a condition associated with a failure to receive the expected end of session indicator.

19. The system of claim 18 wherein the plurality of base stations comprises a digital base station and an analog base station, and wherein the circumstance evaluator of the each mobile subscriber unit is configured to detect a transition from a digital network associated with the digital base station to an analog network associated with the analog base station.

20. A method for an over-the-air programming session, comprising:
- a mobile subscriber unit receiving an over-the-air programming call on a communication channel to begin an over-the-air programming session, the over-the-air programming call initiated by a wireless network, the over-the-air programming call comprising an expected end-of-session indicator;
- the mobile subscriber unit transitioning from a digital network to an analog network while engaged in the over-the-air programming session;
- the mobile subscriber unit determining that the expected end-of-session indicator has not been received from the wireless network, wherein the determining step of occurs without a prior request for the expected end-of-session indicator from the mobile subscriber unit; and
- the mobile subscriber unit terminating the over-the-air programming call by releasing the communication channel upon the determination that the expected end-of-session indicator has not been received.

21. The method of claim 20, wherein the over-the-air programming session is an over-the-air service provisioning session.

22. The method of claim 20, wherein the over-the-air programming session is an over-the-air service parameter administration session.

23. The method of claim 20, wherein the expected end-of-session indicator comprises an over-the-air end of session message received from the wireless network.

24. The method of claim 20, wherein the step of determining that the expected end-of-session indicator has not been received further comprises detecting that a time-out period has lapsed without receiving an over-the-air end of session message from the wireless network.

25. A mobile subscriber apparatus with OTA programming call handling, comprising:
- a memory containing software instructions;
- a user interface configured to display information to a subscriber;
- a microprocessor coupled to the memory and the user interface;
- a transceiver coupled to the microprocessor, the transceiver comprising a receiver configured to receive a wireless communication signal from an antenna coupled to the transceiver and to filter, amplify, and demodulate the received wireless communication signal and to provide the received wireless communication signal to the processor, the transceiver further comprising a transmitter configured to modulate a wireless communication signal generated by the microprocessor and to send the modulated wireless communication signal to the antenna for transmission;
- an end of session detector connected to the processor configured to detect an expected end of session message sent by the network, the expected end of session message being received by the antenna and processed by the microprocessor before being detected by the end of session detector, the expected end of session message being an expected message indicating a normal termination of an OTA programming call, wherein the expected end of session message is expected to be detected without a prior request sent via the antenna or without an occurrence of a fault condition; and
- a call terminator coupled to the end session detector, the call terminator configured to terminate the OTA programming call when the end of session detector detects the expected end of session message or fails to receive the expected end of session message within a time out period.

* * * * *